(12) United States Patent
Kobayashi et al.

(10) Patent No.: US 6,602,945 B2
(45) Date of Patent: Aug. 5, 2003

(54) VIBRATION DAMPING SILICONE COMPOSITION

(75) Inventors: Hideki Kobayashi, Chiba (JP); Masayuki Hayashi, Chiba (JP)

(73) Assignee: Dow Corning Toray Silicone Company Limited, Tokyo (JP)

(*) Notice: Subject to any disclaimer, the term of this patent is extended or adjusted under 35 U.S.C. 154(b) by 0 days.

(21) Appl. No.: 09/994,503

(22) Filed: Nov. 27, 2001

(65) Prior Publication Data

US 2002/0095011 A1 Jul. 18, 2002

(30) Foreign Application Priority Data

Nov. 28, 2000 (JP) ......................................... 2000-361616

(51) Int. Cl.$^7$ ................................................ C08K 3/36
(52) U.S. Cl. ...................... 524/492; 524/588; 525/477; 428/402; 428/405
(58) Field of Search ................................. 428/402, 405; 524/492, 588; 525/477

(56) References Cited

U.S. PATENT DOCUMENTS

| | | | | |
|---|---|---|---|---|
| 3,455,839 A | * | 7/1969 | Rauner | 516/117 |
| 3,894,169 A | | 7/1975 | Miller | 428/425 |
| 4,374,950 A | | 2/1983 | Shimizu | 524/765 |
| 4,416,790 A | | 11/1983 | Schurmann et al. | 252/62 |
| 4,514,529 A | | 4/1985 | Beers et al. | 523/200 |
| 4,678,828 A | | 7/1987 | Nakamura et al. | 524/265 |
| 5,169,561 A | * | 12/1992 | Gentle et al. | 516/119 |
| 5,342,721 A | | 8/1994 | Akamatsu | 430/108 |
| 5,486,306 A | * | 1/1996 | L'Hostis et al. | 516/117 |
| 5,550,185 A | | 8/1996 | Inoue et al. | 524/847 |
| 5,661,203 A | | 8/1997 | Akamatsu et al. | 524/269 |
| 5,745,472 A | | 4/1998 | Son | 369/263 |
| 5,840,220 A | | 11/1998 | Akamatsu et al. | 264/15 |
| 6,347,411 B1 | | 2/2002 | Darling | 2/272 |
| 6,384,125 B1 | * | 5/2002 | Bergstrom et al. | 524/492 |

FOREIGN PATENT DOCUMENTS

| | | | |
|---|---|---|---|
| EP | 0 635 549 B1 | 7/1994 | C08L/83/04 |
| EP | 0 990 816 A1 | 9/1999 | F16F/9/00 |
| EP | 0990816 | 4/2000 | |
| FR | 2740463 | 4/1997 | |
| JP | 62-113932 | 5/1987 | F16F/13/00 |
| JP | 63308241 | 12/1988 | |
| JP | 63-308242 | 12/1988 | F16F/13/00 |
| JP | 09263525 | 10/1997 | A61K/7/46 |
| JP | 10251517 | 9/1998 | |
| JP | 10281202 | 10/1998 | |
| JP | 11182624 | 7/1999 | |
| JP | 2000-80277 | 3/2000 | C08L/83/04 |

* cited by examiner

*Primary Examiner*—Robert Dawson
*Assistant Examiner*—Marc S. Zimmer
(74) *Attorney, Agent, or Firm*—McKellar Stevens; Robert L. McKellar

(57) ABSTRACT

A vibration damping silicone composition that exhibits an excellent vibration damping performance and long-term storage stability comprising a silicone oil, a silicone resin powder that is solid at room temperature, and a surface-hydrophobic silica powder having a pH of greater than 6 but less than 9. The composition is particularly useful in shock absorbers for electronic and/or electrical equipment such as compact disk players, compact disk changers, mini-disk players, and car navigation devices.

9 Claims, No Drawings

VIBRATION DAMPING SILICONE COMPOSITION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention relates to a vibration damping silicone composition and particularly to a vibration damping silicone composition that has excellent long-term storage stability.

BACKGROUND OF THE INVENTION

A large number of vibration damping compositions comprising a viscous fluid and solid powder have already been proposed. For example, Japanese Patent Application Publication Number Sho 63-308241 (308,241/1988) describes a vibration damping composition comprising a viscous fluid (e.g., silicone oil) and a solid powder such as silica powder, glass powder, or silicone resin powder. Japanese Patent Application Publication Number Hei 10-251517 (251,517/1998) describes a vibration damping composition comprising a silicone resin powder and a viscous fluid such as silicone oil. Japanese Patent Application Publication Number Hei 10-281202 (281,202/1998) describes a viscous fluid blend comprising silsesquioxane powder and non-surface-treated wet-process silica micropowder in silicone oil. Japanese Patent Application Publication Number Hei 11-182624 (182,624/1999) describes a viscous fluid blend of silsesquioxane powder, wet-process silica micropowder, and silanol-terminated dimethylsiloxane in silicone oil.

However, these compositions typically undergo changes when stored and/or used over extended periods of time, resulting in a deterioration in their vibration damping properties.

DETAILED DESCRIPTION OF THE INVENTION

This invention relates to a vibration damping silicone composition comprising:

A. a silicone oil,
B. a silicone resin which is solid at room temperature, and
C. a surface-hydrophobic silica powder having a pH of greater than 6 and less than 9.

In a preferred composition there is provided

A. 100 parts by weight of silicone oil,
B. 10 to 300 parts by weight of a silicone resin powder which is solid at room temperature, and
C. 0.1 to 10 parts by weight of a surface-hydrophobic silica powder having a pH of greater than 6 and less than 9.

Component A, the Silicone oil, functions as the matrix component in which components B and C are dispersed. The silicone oil is an organopolysiloxane, comprising substantially of units of the formula $R'_2SiO_{2/2}$ and is a liquid at room temperature. The R' groups bonded to the silicon atoms may be the same or different and are typically monovalent hydrocarbon groups, for example alkyl groups such as methyl, ethyl, propyl and octyl groups; alkenyl groups such as vinyl, allyl, and butenyl groups and aryl groups such as phenyl and tolyl groups. Halogenated alkyl groups such as 3,3,3-trifluoropropyl may also be used. Small amounts of these hydrocarbon groups may be replaced by hydroxyl groups, or alkoxy groups such as methoxy, and ethoxy groups. Preferably most R' groups are alkyl groups, most preferably methyl groups. Alkyl groups are preferred because the composition in accordance with the present invention containing such silicone oils has a low degree of change of viscosity with respect to temperature and excellent storage stability.

Component A may be a linear, partially branched linear, branched, or cyclic. A linear structure is preferred. Component A should have a kinematic viscosity at 25° C. of from 100 to 1,000,000 mm²/s, preferably from 500 to 500,000 mm²/s. When the kinematic viscosity at 25° C. is less than 100 mm²/s, it is difficult to maintain components B and C in a uniformly dispersed state in component A. When the viscosity of component A exceeds 1,000,000 mm²/s, handling properties deteriorate, and components B and C are difficult to disperse in component A. Component A may be exemplified by trimethylsiloxy-endblocked dimethylpolysiloxanes, dimethylvinylsiloxy-endblocked dimethylpolysiloxanes, trimethylsiloxy-endblocked methyloctylpolysiloxanes, silanol-endblocked dimethylpolysiloxanes, and trimethylsiloxy-endblocked dimethylsiloxane-methylphenylsiloxane copolymers.

Component B, the Silicone resin powder, is a solid at room temperature and is utilised to enhance the vibration damping performance of the composition in accordance with the invention. Component B may be an organopolysiloxane containing $RSiO_{3/2}$ units and/or $SiO_{4/2}$ units in the main skeleton structure. Component B may also contain $R_2SiO_{2/2}$ units and/or $R_3SiO_{1/2}$ units. An organopolysilsesquioxane powder containing substantially only $RSiO_{3/2}$ units is most preferred. Preferably R is a monovalent hydrocarbon group for example alkyl groups such as methyl, ethyl, and propyl; alkenyl groups such as vinyl, allyl, and butenyl; and aryl groups such as phenyl and tolyl. R may also be a halogenated alkyl group such as 3,3,3-trifluoropropyl. In addition, some of these groups may be substituted by hydroxyl groups or alkoxy groups such as methoxy and ethoxy groups. Alkyl groups are preferred as the resulting composition in accordance with the invention containing such resins has only a low degree of change of viscosity with respect to temperature and excellent storage stability. Each R may be the same or different, but it is preferred that at least 50 percent of the R groups are alkyl groups, most preferably methyl groups.

A small number of hydroxyl groups, halogen groups such as chlorine and/or alkoxy groups such as methoxy and ethoxy groups may be present at terminal ends in the molecular chain of the silicone resin powder. Component B may have an average particle size of from 0.1 to 100 μm, preferably from 10 to 40 μm. The shape of the particles may be spherical, oblate, or irregular. The amount of component B to be added per 100 parts by weight of component A may be in the range of from 10 to 300 parts by weight, preferably from 20 to 200 parts by weight. When the amount of component B is less than 10 parts by weight, the vibration damping properties of the composition according to the present invention tend to deteriorate, and when the amount of component B exceeds 300 parts by weight, the operating properties composition in accordance with the present invention deteriorate.

Component C, the surface-hydrophobic silica powder, functions in the composition according to the present invention as a means of improving both the storage stability and vibration damping performance of the composition. The pH of component C must be greater than 6 but less than 9 and is preferably in the range of from 6.5 to 8.5. Properties such as the thermal stability and storage stability undergo a decline at a pH of 6 or below and at a pH of 9 or above. For example component A may depolymerise in a more acidic environment than pH 6 or a more alkaline environment than pH 9. For the purposes of this invention, the pH values are all measured using a glass electrode pH meter, and each sample tested is an ethanol/water suspension of a surface-treated silica powder prepared by wetting 2 g of the surface-treated silica powder with 25 ml ethanol followed by dispersion of the ethanolic silica in 25 ml water whose pH has been adjusted to 7.0. Both wet-process and dry-process silicas may be used as the silica powder of component C. The silica used will generally have a BET specific surface area in the range of from 40 to 500 $m^2/g$. Wet-process silica powder with a BET specific surface area in the range of from 50 to 400 $m^2/g$ is preferred. An organopolysiloxane with a low degree of polymerisation (DP) is generally used to surface treat the silica of component C to render it hydrophobic. The kinematic viscosity of the organopolysiloxane used to surface treat the silica is preferably from 0.5 to 100 $mm^2/s$ and the DP is preferably from 2 to about 90. Examples of the organopolysiloxane, which may be used to surface treat the silica of component C, include trimethylsiloxy- and dimethylsiloxy-endblocked dimethylpolysiloxanes, methylhydrogenpolysiloxanes, and dimethylsiloxane-methylhydrogensiloxane copolymers. The surface treatment of the silica powder with organopolysiloxane, to render it hydrophobic, may be carried out for example, by either:

i) adding the organopolysiloxane to the silica powder while the powder is being stirred and then heating the resulting mixture whilst continuing to stir; or ii) spraying organopolysiloxane on to the silica powder while the powder is stirred and then heating the resulting mixture whilst continuing to stir.

This hydrophobing surface treatment may be carried out either in air or an inert atmosphere. The heating temperature will generally be in the range of from 100 to 500° C. and preferably is in the range of from 150 to 450° C. The treatment time will vary dependent on the treatment temperature, but will generally be from 10 minutes to 5 hours.

The extent of the surface treatment or hydrophobisation ratio may be expressed by the methanol value (M value). The M value is the lowest volume % of methanol in an aqueous methanol solution in which hydrophobic silica powder becomes sedimentable. That is, when a hydrophobic silica powder is introduced into a series of aqueous methanol solutions having different concentrations, the M value is the volume % of methanol in the least concentrated aqueous solution in which the silica powder has sedimented. The M value increases as the hydrophobisation ratio increases given that as a general matter it becomes increasingly difficult to achieve dispersion and sedimentation in dilute aqueous methanol solutions as the hydrophobisation ratio of the surface of the silica powder grows larger. The M value of component C is preferably in the range of from 20 to 50 and more preferably is in the range of from 25 to 40. The surface treatment will be inadequate and the storage stability will be impaired when the M value is less than 20, while the effect of the addition is reduced when the M value exceeds 50.

Component C is preferably added into the composition of the present invention in the range of from 0.1 to 10 parts by weight and more preferably 0.5 to 7.0 parts by weight per 100 parts by weight of component A. The vibration damping performance of the resulting composition declines when component C is present in the composition in an amount of less than 0.1 weight part, while the working properties of the resulting composition deteriorate when component C is present in the composition in an amount in excess of 10 parts by weight.

In addition to components A, B and C, compositions according to the present invention may include a variety of additives but only to an extent that the damping characteristics of the composition are not impaired. These may include, for example, inorganic micropowders such as glass micropowder, silica micropowder, clay, bentonite, diatomaceous earth, and quartz powder and organic resin micropowders such as acrylic resin micropowder, fluororesin micropowder, and phenolic resin micropowder. Other additives, which may be introduced into the composition of the present invention, include anti-oxidants, rust inhibitors, flame retardants, pigments and dyes. The composition is preferably in the form of a viscous liquid or semi-solid state at room temperature.

Compositions in accordance with the present invention containing components A, B and C may be prepared by combining and kneading the ingredients in a mixer such as, for example, a ball mill, a vibrating mill, a kneader-mixer, a screw extruder, a paddle mixer, a ribbon mixer, a Banbury mixer, a Ross mixer, a Henschel mixer, a flow jet mixer, a Hubbard mixer, or a roll mixer. Heating may be used during the mixing process, preferably at a temperature of from 30 to 200° C. Whilst the pressure used during mixing may be atmospheric, mixing under a reduced pressure is preferred.

The composition in accordance with the present invention has the following characteristics: an excellent vibration damping performance, an excellent storage stability, and a low response to temperature variations. Because of these advantages, the composition may be used in shock absorbers prepared by filling elastic containers such as rubber bags or rubber cylinders with the composition. It is particularly suitable in shock absorbers used in electrical and electronic equipment in environments where there exist considerable temperature fluctuation, such as in compact disk players, compact disk changers, mini-disk players, and car navigation devices.

EXAMPLES

The invention is explained in greater detail below by way of the following examples. The values reported for the viscosity and kinematic viscosity in the examples were measured at 25° C. The vibration damping properties were evaluated by measuring a loss tangent coefficient (tan δ) at 25° C. and 60° C.

The loss tangent coefficient (tan δ) was measured by the plate method using a Dynamic Analyzer Model RDA-700 of Rheometrix. The conditions under which measurements were conducted include a plate diameter of 25 mm, a frequency of 10 Hz, a strain of 20%, and a sample thickness of 1 mm.

Reference Example 1

The Preparation of Hydrophobic Silica 100 parts by weight of wet-process silica powder with a BET specific surface area of 200 $m^2/g$ (Nipsil LP from Nippon Silica Industrial Co., Ltd.) was introduced into a flask and stirred. 10 parts of a trimethylsiloxy-endblocked dimethylsiloxane-methylhydrogensiloxane copolymer oil (average formula: $Me_3SiO(Me_2SiO)_5(MeHSiO)_5SiMe_3$ wherein Me=methyl) was added to the flask whilst stirring was continued. The resulting mixture was heated for 3 hours at 280° C. to produce a surface-hydrophobic wet-process silica powder.

25 ml ethanol was then introduced into a glass flask and 2 g of the surface-hydrophobic wet-process silica powder, produced as described above, was added to the ethanol and dispersed therein. This was followed by the addition of 25 ml water (pH adjusted to 7.0) to the ethanol dispersion and the resulting mixture was re-dispersed to obtain an ethanol/water suspension of the silica powder. The pH of the re-dispersed suspension was measured using a glass electrode pH meter and was found to be 7.

Twenty-one aqueous methanol solutions were prepared by varying the methanol: water mixing ratio from 0:100 to 100:0 in 5 volume % steps. The silica powder sedimentation behaviour was measured by adding 0.1 g of the surface-hydrophobic wet-process silica powder synthesized as described above to 10 ml of each of these solutions and shaking the solution twice. The least concentrated aqueous methanol solution in which the silica powder underwent sedimentation had a methanol volume % (methanol value) of 30. The silica powder had an apparent specific gravity of 300 g/l.

Application Example 1

The following were introduced into a Ross mixer: 1000 g of a trimethylsiloxy-endblocked dimethylpolysiloxane having a viscosity of 10,000 mm²/s, 460 g of a methylpolysilsesquioxane powder composed of only $CH_3SiO_{3/2}$ siloxane units (average particle size=20 μm), and 30 g of surface-hydrophobic wet-process silica powder (pH 7), prepared as described in Reference Example 1. The resulting mixture was mixed to homogeneity using the Ross mixer at a low speed (150 rpm) with scraping. The homogenous mixture was then mixed and kneaded for a further 2 hours at reduced pressure (100 mmHg). The viscosity of the resulting silicone composition was 70 Pa·s. The vibration damping performance of this silicone composition was measured at both 25° C. and 60° C. The silicone composition was then allowed to stand for 3 months and its vibration damping performance was again measured at 25° C. The change in the vibration damping performance was calculated from the following equation. The various results are reported in Table 1.

$$\text{change}(\Delta \tan \delta) = \frac{(\tan \delta)_2 - (\tan \delta)_1}{(\tan \delta)_1} \times 100 \ (\%)$$

wherein $(\tan \delta)_1$ is the value measured at 25° C. immediately after preparation and $(\tan \delta)_2$ is the value measured at 25° C. after standing for 3 months.

The viscosity of the silicone composition was re-measured after standing for 12 months. A change of only 2% (2% decline) was determined, which confirmed the long-term stability of this silicone composition.

Application Example 2

The following were introduced into a Ross mixer: 1,000 g trimethylsiloxy-endblocked dimethylpolysiloxane with a viscosity of 30,000 mm²/s, 800 g methylpolysilsesquioxane powder composed of only $CH_3SiO_{3/2}$ siloxane units (average particle size=20 μm), and 25 g of the surface-hydrophobic wet-process silica powder (pH=7) prepared as described in Reference Example 1. The resulting mixture was mixed to homogeneity using the Ross mixer at a low speed (150 rpm) with scraping. The homogenous mixture was then mixed and kneaded for a further 2 hours at reduced pressure (100 mmHg). The viscosity of the resulting silicone composition was 1,000 Pa·s.

The vibration damping performance of this silicone composition was measured as described in Example 1 both immediately $(\tan \delta)_1$ and after an ageing period of three months $(\tan \delta)_2$ to determine the change in the vibration damping performance ($\Delta \tan \delta$). These results are reported in Table 1. The viscosity of the silicone composition was re-measured after standing for 12 months. A change of 9% (9% increase) was determined, which confirmed the long-term stability of this silicone composition.

Application Example 3

The following were introduced into a Ross mixer: 1,000 g trimethylsiloxy-endblocked dimethylpolysiloxane with a viscosity of 20,000 mm²/s, 500 g methylpolysilsesquioxane powder composed of only $CH_3SiO_{3/2}$ siloxane units (average particle size=20 μm), and 30 g of the surface-hydrophobic wet-process silica powder (pH=7), prepared as described in Reference Example 1. The resulting mixture was mixed to homogeneity using the Ross mixer at a low speed (150 rpm) with scraping. The homogenous mixture was then mixed and kneaded for a further 2 hours at reduced pressure (100 mmHg). The viscosity of the resulting silicone composition was 500 Pa·s.

The vibration damping performance of this silicone composition was measured as described in Example 1 both immediately $(\tan \delta)$ and after an ageing period of three months $(\tan \delta)_2$ to determine the change in the vibration damping performance ($\Delta \tan \delta$) These results are reported in Table 1. The viscosity of the silicone composition was re-measured after standing for 12 months. A change of 4% (4% increase) was determined, which confirmed the long-term stability of this silicone composition.

Application Example 4

The following were introduced into a Ross mixer: 1,000 g trimethylsiloxy-endblocked dimethylpolysiloxane with a viscosity of 10,000 mm²/s, 500 g methylpolysilsesquioxane powder composed of only $CH_3SiO_{3/2}$ siloxane units (average particle size=20 μm), and 3 g of a dry-process silica powder, the surface of which had been rendered hydrophobic by treatment with a low-viscosity trimethylsiloxy-endblocked dimethylpolysiloxane. This silica powder gave a pH of 7, a BET specific surface area of 100 m²/g and an apparent specific gravity of 50 g/l. The resulting mixture was mixed to homogeneity using the Ross mixer at a low speed (150 rpm) with scraping. The homogenous mixture was then mixed and kneaded for a further 2 hours at reduced pressure (100 mmHg). The viscosity of the resulting silicone composition was 70 Pa·s.

The vibration damping performance of this silicone composition was measured as described in Example 1 both immediately $(\tan \delta)_1$ and after an ageing period of three months $(\tan \delta)_2$ to determine the change in the vibration damping performance ($\Delta \tan \delta$) These results are reported in Table 1. The viscosity of the silicone composition was re-measured after standing for 12 months. A change of 2% (2% decline) was determined, which confirmed the long-term stability of this silicone composition.

Comparative Example 1

The following were introduced into a Ross mixer: 1,000 g trimethylsiloxy-endblocked dimethylpolysiloxane with a viscosity of 10,000 mm²/s, 680 g methylpolysilsesquioxane powder composed of only $CH_3SiO_{3/2}$ siloxane units (average particle size=20 μm), and 45 g of a non-surface-treated wet-process silica powder. This silica powder gave a pH of 6, a methanol value of 0 and an apparent specific gravity of 70 g/l. The resulting mixture was mixed to homogeneity using the Ross mixer at a low speed (150 rpm) with scraping. The homogenous mixture was then mixed and kneaded for a further 2 hours at reduced pressure (100 mmHg). The viscosity of the resulting silicone composition was 76 Pa·s.

The vibration damping performance of this silicone composition was measured as described in Example 1 both immediately $(\tan \delta)_1$ and after an ageing period of three months $(\tan \delta)_2$ to determine the change in the vibration damping performance $(\Delta \tan \delta)$. These results are reported in Table 1. The viscosity of the silicone composition was re-measured after standing for 12 months. A change of 28% (28% decline) was determined, which indicated a poor storage stability.

TABLE 1

| | vibration damping performance | | change (Δtan δ) at |
|---|---|---|---|
| | $(\tan \delta)_1$ (25° C.) | $(\tan \delta)_1$ (60° C.) | 25° C., after 3 months |
| Example 1 | 18 | 27 | −4 |
| Example 2 | 10 | 16 | −5 |
| Example 3 | 14 | 21 | −5 |
| Example 4 | 18 | 26 | −4 |
| Comp. Ex. 1 | 13 | 21 | −9 |

Because the inventive vibration damping silicone composition of the present invention comprises components A, B, and C and in particular because it contains component C (surface-hydrophobic silica powder with a pH greater than 6 but less than 9), is characterized by a superior vibration damping properties and long-term storage stability.

Other variations may be made in compounds, compositions, and methods described herein without departing from the essential features of the invention. The embodiments of the invention specifically illustrated herein are exemplary only and not intended as limitations on their scope except as defined in the appended claims.

That which is claimed is:

1. A vibration damping silicone composition comprising:
   A. a silicone oil,
   B. a silicone resin which is solid at room temperature, and
   C. a surface-hydrophobic silica powder having a pH of greater than 6 and less than 9.

2. A vibration damping silicone composition in accordance with claim 1 comprising
   A. 100 parts by weight silicone oil,
   B. 10 to 300 parts by weight powder of a silicone resin that is solid at room temperature, and
   C. 0.1 to 10 parts by weight surface-hydrophobic silica powder whose pH exceeds 6 but is less than 9.

3. A vibration damping silicone composition in accordance with claim 1 in which component C is a wet-process silica powder.

4. A vibration damping silicone composition in accordance with claim 1 in which component C has been rendered hydrophobic by application of a coating comprising an organopolysiloxane having a degree of polymerisation of from 2 to 90.

5. A vibration damping silicone composition in accordance with claim 4 in which the organopolysiloxane is selected from the group consisting of trimethylsiloxy—endblocked dimethylpolysiloxanes, dimethylsiloxy-endblocked dimethylpolysiloxanes, methylhydrogenpolysiloxanes, and dimethylsiloxane-methylhydrogensiloxane copolymers.

6. A vibration damping silicone composition in accordance with claim 1 in which component B has an average particle size of from 0.1 to 100 μm.

7. A vibration damping silicone composition in accordance with claim 1 in which component B comprises a silsesquioxane.

8. A vibration damping silicone composition in accordance with claim 7 in which component B comprises a silsesquioxane substantially consisting of units of the formula $RSiO_{3/2}$ wherein R is an alkyl group.

9. A shock absorber for electrical and electronic equipment comprising a vibration damping silicone composition in accordance with claim 1.

* * * * *